United States Patent
Su et al.

(10) Patent No.: US 10,787,363 B2
(45) Date of Patent: Sep. 29, 2020

(54) HYDROGEN PRODUCING APPARATUS WITH EMULSIFIER

(71) Applicant: Automotive Research & Testing Center, Lugong, Changhua County (TW)

(72) Inventors: Siou-Sheng Su, Lugong (TW); Ke-Wei Lin, Lugong (TW)

(73) Assignee: AUTOMOTIVE RESEARCH & TESTING CENTER, Lugong (TW)

(*) Notice: Subject to any disclaimer, the term of this patent is extended or adjusted under 35 U.S.C. 154(b) by 131 days.

(21) Appl. No.: 16/233,295

(22) Filed: Dec. 27, 2018

(65) Prior Publication Data
US 2020/0207619 A1 Jul. 2, 2020

(51) Int. Cl.
| | |
|---|---|
| *C01B 3/26* | (2006.01) |
| *B01J 8/02* | (2006.01) |
| *H01M 8/0612* | (2016.01) |
| *C01B 3/32* | (2006.01) |

(52) U.S. Cl.
CPC .............. *C01B 3/26* (2013.01); *B01J 8/0278* (2013.01); *B01J 8/0285* (2013.01); *C01B 3/323* (2013.01); *H01M 8/0618* (2013.01); *B01J 2208/00389* (2013.01); *C01B 2203/025* (2013.01); *H01M 2250/20* (2013.01)

(58) Field of Classification Search
CPC ............. C01B 3/384; C01B 2203/0811; C01B 2203/0816; C01B 2203/0883
See application file for complete search history.

(56) References Cited

U.S. PATENT DOCUMENTS

| | | | | |
|---|---|---|---|---|
| 3,350,176 A | * | 10/1967 | Geissler | C01B 3/38 422/109 |
| 3,920,416 A | * | 11/1975 | Houseman | B01F 5/02 48/95 |
| 3,982,910 A | * | 9/1976 | Houseman | C01B 3/22 48/61 |
| 4,008,692 A | * | 2/1977 | Shinohara | F02B 43/00 123/3 |
| 4,033,133 A | * | 7/1977 | Houseman | C01B 3/386 60/606 |
| 4,781,241 A | * | 11/1988 | Misage | F22B 33/18 165/140 |
| 5,382,271 A | * | 1/1995 | Ng | B01J 7/00 422/200 |

(Continued)

FOREIGN PATENT DOCUMENTS

JP 2016210884 A * 12/2016

*Primary Examiner* — Imran Akram
(74) *Attorney, Agent, or Firm* — Burris Law, PLLC (57) ABSTRACT

A hydrogen producing apparatus includes a reforming unit, a feed unit, and a heating unit. The reforming unit includes a casing defining a receiving space and having gas intake and outlet ports, a plurality of reformers disposed in the receiving space, at least one gas pipe winding around one of the reformers, and a connecting pipe in fluidic communication with the gas pipe. The feed unit is in fluidic communication with the reformers and the connecting pipe such that air delivered from the gas intake port through the gas pipe and the connecting pipe is mixed with a fuel in the feed unit to form a reactant mixture to be fed to the reformers for hydrogen production. The heating unit includes a heater connected to the casing.

10 Claims, 5 Drawing Sheets

(56) References Cited

U.S. PATENT DOCUMENTS

| | | | | |
|---|---|---|---|---|
| 5,458,857 | A * | 10/1995 | Collins | B01J 8/0449 422/198 |
| 5,589,599 | A * | 12/1996 | McMullen | C01B 32/30 585/240 |
| 5,639,431 | A * | 6/1997 | Shirasaki | B01J 8/0285 422/212 |
| 5,932,181 | A * | 8/1999 | Kim | B01D 53/48 422/187 |
| 6,077,620 | A * | 6/2000 | Pettit | B01J 8/0438 429/425 |
| 6,083,425 | A * | 7/2000 | Clawson | B01J 8/0278 252/372 |
| 6,413,479 | B1 * | 7/2002 | Kudo | B01J 8/0465 208/133 |
| 7,037,349 | B2 | 5/2006 | Dauer et al. | |
| 7,066,973 | B1 * | 6/2006 | Bentley | B01J 8/0465 422/198 |
| 7,332,003 | B1 * | 2/2008 | Li | C01B 3/386 422/198 |
| 2001/0000380 | A1 * | 4/2001 | Buxbaum | B01J 8/0285 95/55 |
| 2001/0045061 | A1 * | 11/2001 | Edlund | B01J 8/0449 48/76 |
| 2003/0159354 | A1 * | 8/2003 | Edlund | C01B 3/503 48/127.9 |
| 2003/0188475 | A1 * | 10/2003 | Ahmed | H01M 8/0675 44/639 |
| 2005/0173304 | A1 | 8/2005 | Kabashima | |
| 2006/0188434 | A1 * | 8/2006 | Mahlendorf | B01J 8/0453 423/652 |
| 2007/0231631 | A1 | 10/2007 | Venkataraman | |
| 2009/0202873 | A1 * | 8/2009 | Edlund | H01M 8/0631 429/411 |
| 2013/0343985 | A1 * | 12/2013 | Krueger | B01J 8/0496 423/651 |
| 2014/0023560 | A1 * | 1/2014 | Chao | B01J 12/005 422/162 |

\* cited by examiner

HYDROGEN PRODUCING APPARATUS WITH EMULSIFIER

FIELD

The disclosure relates to a hydrogen producing apparatus, and more particularly to a hydrogen producing apparatus including a reforming unit for carrying out a reforming reaction.

BACKGROUND

With increasing environmental consciousness and stringent environmental regulations worldwide, the development of clean energy technologies has become an important goal in many countries. Hydrogen energy has been proven to be one of the most promising clean energies.

Hydrogen gas is conventionally produced by hydrocarbon fuel reforming process, electrolysis, etc. The hydrocarbon fuel reforming process involves conversion of natural gas, liquefied petroleum gas (LPG), methanol or other high carbon ratio fuel into a hydrogen-rich gas. The hydrogen-rich gas thus produced can be used in a fuel cell for conversion to electrical energy. In particular, the hydrogen-rich gas is applicable to a fuel cell vehicle (FCV) as a clean energy source. Alternatively, the hydrogen-rich gas is applicable to internal combustion engines or boilers for improving combustion efficiency and reducing exhaust gas pollution.

The hydrocarbon fuel reforming process generally includes the autothermal reforming (ATR) process, the steam reforming (SR) process, and the partial oxidation (POX) process. In the ATR and SR processes, water is an essential component along with the aforementioned natural gas and high carbon ratio fuel. Therefore, in addition to the effective management of the thermal energy of the reformer, homogenous mixing of the fuel and water is another issue that needs to be thoroughly considered.

SUMMARY

Therefore, an object of the disclosure is to provide a hydrogen producing apparatus that can alleviate at least one of the drawbacks of the prior art.

According to the disclosure, a hydrogen producing apparatus includes a reforming unit, a feed unit, and a heating unit.

The reforming unit includes a casing, a plurality of reformers, at least one gas pipe, and a connecting pipe. The casing defines a receiving space therein and has a gas intake port and a gas outlet port spaced apart from the gas intake port. The gas intake and outlet ports are in fluidic communication with the receiving space. The reformers are separately disposed in the receiving space and are in non-fluidic communication with the receiving space. The at least one gas pipe extends between and through the gas intake and outlet ports of the casing and winds around one of the reformers. The connecting pipe has a first end connected to the gas outlet port and is in fluidic communication with the at least one gas pipe, and a second end opposite to the first end.

The feed unit is connected to the casing and is in fluidic communication with the reformers and the second end of the connecting pipe such that air delivered from the gas intake port through the gas pipe and the connecting pipe is mixed with a fuel in the feed unit to form a reactant mixture to be fed to the reformers for hydrogen production.

The heating unit includes a heater that is connected to the casing and that is configured for heating the receiving space.

BRIEF DESCRIPTION OF THE DRAWINGS

Other features and advantages of the disclosure will become apparent in the following detailed description of the embodiments with reference to the accompanying drawings, of which.

DETAILED DESCRIPTION

Before the disclosure is described in greater detail, it should be noted that where considered appropriate, reference numerals or terminal portions of reference numerals have been repeated among the figures to indicate corresponding or analogous elements, which may optionally have similar characteristics.

Figure 1:
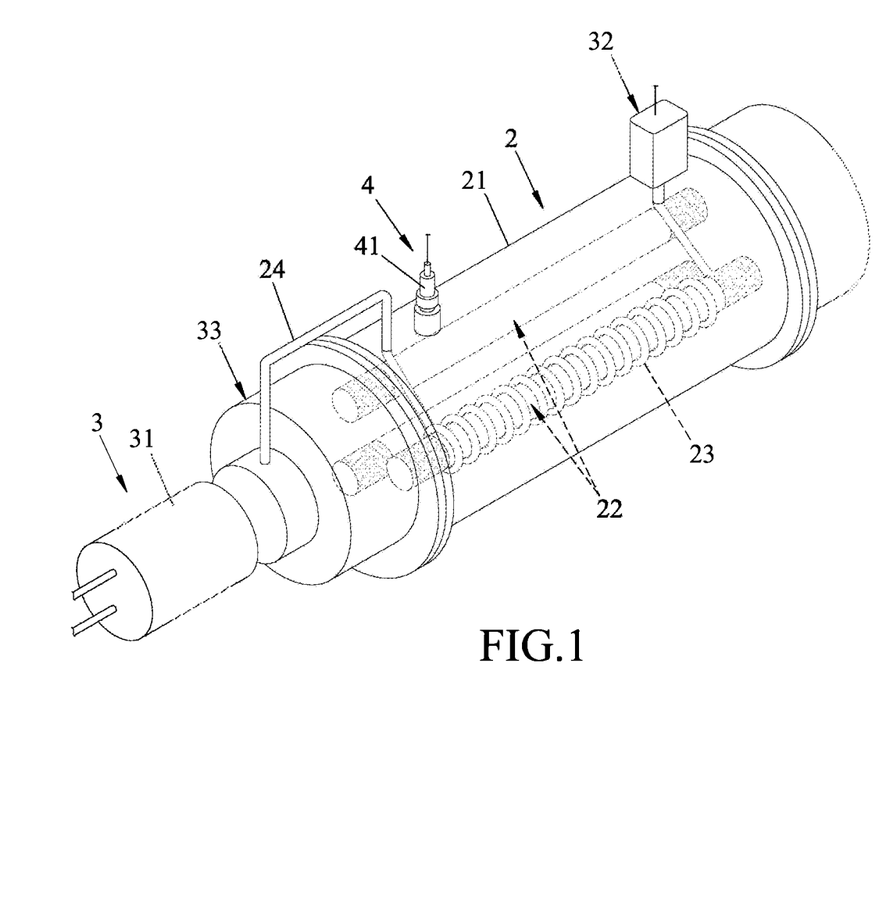
FIG. 1 is a fragmentary perspective view illustrating a first embodiment of a hydrogen producing apparatus according to the disclosure.
Figure 2:
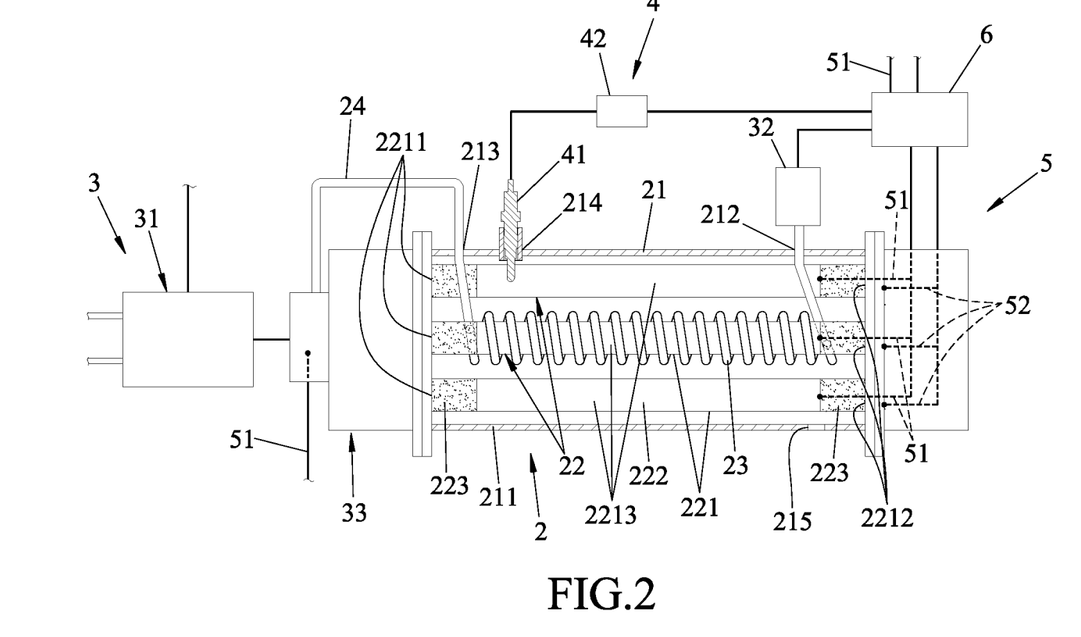
FIG. 2 is a partially cross-sectional view illustrating the first embodiment.

Referring to FIGS. 1 and 2, a first embodiment of a hydrogen producing apparatus according to the disclosure includes a reforming unit 2, a feed unit 3, a heating unit 4, a detection unit 5 and a control unit 6. FIG. 1 mainly illustrates the reforming unit 2, the feeding unit 3 and the heating unit 4 of the first embodiment, and FIG. 2 illustrates how the reforming unit 2, the feed unit 3, the heating unit 4, the detection unit 5 and the control unit 6 are connected to each other.

The reforming unit 2 includes a casing 21, a plurality of reformers 22, at least one gas pipe 23 winding around one of the reformers 22, and a connecting pipe 24. In this embodiment, only one gas pipe 23 is illustrated. In another arrangement, the reforming unit 2 may include a plurality of the gas pipes 23, and the number of the gas pipes 23 may be not greater than the number of the reformers 22. Each of the gas pipes 23 winds around a corresponding one of the reformers 22.

The casing 21 defines a receiving space 211 therein, and has a gas intake port 212, a gas outlet port 213, a heating unit-mounting port 214 and an exhaust port 215 which are spaced apart from each other. The gas intake port 212 and the gas outlet port 213 are in fluidic communication with the receiving space 211. The gas pipe 23 extends between and through the gas intake port 212 and the gas outlet port 213 of the casing 21. The connecting pipe 24 has a first end 241 that is connected to the gas outlet port 213 of the casing 21 and in fluidic communication with the gas pipe 23, and a second end 242 that is opposite to the first end 241.

The reformers 22 are separately disposed in the receiving space 211 of the casing 21 and are in non-fluidic communication with the receiving space 211. The gas pipe 23 winds around one of the reformers 22. To be specific, each of the reformers 22 of the reforming unit 2 includes a tubular body 221, a catalyst 222 for a hydrocarbon fuel reforming process, and two opposite ceramic members 223.

The tubular body 221 has an inlet end 2211 that is connected to and in fluidic communication with the feed unit 3, an outlet end 2212 that is opposite to the inlet end 2211, and a reaction portion 2213 that is connected between the inlet and outlet ends 2211, 2212. The catalyst 222 is received in the reaction portion 2213. The porous ceramic members 223 are selected to have good thermal conductivity and are disposed in the inlet and outlet ends 2211, 2212, and are connected to the catalyst 222. The reformers 22 are configured for producing the hydrogen-rich gas or hydrogen from a reactant mixture supplied by the feed unit 3. When the receiving space 211 is heated, the reactant mixture fed into the tubular body 221 can be pre-heated by the heated porous ceramic member 223 in the inlet end 2211 of the tubular body 221 through heat conduction, and heat loss from the reaction portion 2213 can also be reduced by the heated porous ceramic members 223 disposed in the inlet and outlet ends 2211, 2212 of the tubular body 221. The catalyst 222 may include a catalyst carrier and a metal layer coated on the catalyst carrier. The metal layer may be made from a precious metal, such as platinum, palladium, rhodium, ruthenium, etc. The catalyst 222 may have a granular shape or a honeycomb shape. Since the type and the shape of the catalyst 222 per se are well known to those skilled in the art, further details thereof are not provided herein for the sake of brevity.

The feed unit 3 is connected to the casing 21 and is in fluidic communication with the reformers 22 and the second end 242 of the connecting pipe 24. The hydrogen producing apparatus of the disclosure is applicable for producing hydrogen through the autothermal reforming (ATR) process or the partial oxidation (POX) process. When the ATR process is conducted, air delivered from the gas intake port 212 through the gas pipe 23 and the connecting pipe 24 is mixed with fuel and water in the feed unit 3 to form the reactant mixture to be fed to the reformers 22. In the embodiment, the fuel may be selected from natural gas, liquefied petroleum gas, methanol, gasoline, diesel, biomass fuel, etc.

To be specific, the feed unit 3 includes a first feed member 31, a second feed member 32 spaced apart from the first feed member 31, and a mixing member 33 disposed downstream of the first feed member 31. The first feed member 31 is configured for providing the fuel and water. The second feed member 32 is configured to be in fluidic communication with the connecting pipe 24 through the gas pipe 23 for providing the air. The mixing chamber 33 is in fluidic communication with the first feed member 31 and the connecting pipe 24 such that the fuel and water provided from the first feed member 31 and the air provided from the second feed member 32 through the gas pipe 23 and the connecting pipe 24 are mixed to form the reactant mixture in the mixing chamber 33. The mixing chamber 33 is disposed upstream of the reformers 22 and is in fluidic communication with the reformers 22 such that the reactant mixture is fed into the reformers 22. When the POX process is conducted, the first feed member 31 is configured for providing only the fuel.

The heating unit 4 includes a heater 41 and a control member 42. The heater 41 is connected to the casing 21 and is configured for heating the receiving space 211. In this embodiment, the heater 41 is disposed in the heating unit-mounting port 214 of the casing 21. The control member 42 is configured for controlling the heater 41 to heat the receiving space 211 directly so that the reformers 22 are indirectly heated. The heater 41 is exemplified to be a hot air heater. Hot air from the heater 41 is able to flow through the receiving space 211 and be exhausted from the exhaust port 215. In addition, a number of the heater 41 may be more than one, and a number of the heating unit-mounting port 214 may correspond to the number of the heater 41 to be more than one. In this embodiment, the number of the heating unit-mounting port 214, the number of the heater 41, and a number of the exhaust port 215 are each exemplified to be one.

The detection unit 5 includes at least one thermometer 51 and at least one gas detector 52. The at least one thermometer 51 is configured for measuring a temperature of the mixing chamber 33 and a temperature of the outlet end 2212 of the tubular body 221 of each of the reformers 22. The at least one gas detector 52 is configured for detecting composition of a gas flowing out from the outlet end 2212 of the tubular body 221 of each of the reformers 22. The location and the number of the at least one thermometer 51 and the at least one gas detector 52 are adjustable based on actual demand. For example, the detection unit 5 may include a plurality of the thermometers 51 and a plurality of the gas detectors 52. Each of the reformers 22 is provided with one of the thermometers 51 and one of the gas detectors 52. In other arrangements, each of the reformers 22 is provided with one of the thermometers 51, and only one of the reformers 22 is provided with the gas detector 52. Alternatively, each of the reformers 22 is provided with one of the gas detectors 52, and only a portion of the reformers 22 are each provided with the thermometer 51. In this embodiment, each of the thermometers 51 is exemplified to be disposed in a corresponding one of the reformers 22 and each of the gas detectors 52 is exemplified to be disposed at the outlet ends 2212 of the tubular body 221 of a corresponding one of the reformers 22.

The control unit 6 is coupled to the first feed member 31 and the second feed member 32 of the feed unit 3, the at least one thermometer 51 and the at least one gas detector 52 of the detection unit 5, and the heating unit 4, for receiving detection signals transmitted from the at least one thermometer 51 and the at least one gas detector 52, and for transmitting control signals to the feed unit 3 and the heating unit 4 based on the received detection signals. Therefore, the operation of the heating unit 4 and the reactant mixture supplied from the feed unit 3 are both controlled by the control unit 6 according to the detection signals converted from measurement results obtained by the detection unit 5.

When the hydrogen producing apparatus is operated to produce the hydrogen-rich gas (i.e., hydrogen), the receiving space 211 of the casing 21 is first heated by the heater 41 of the heating unit 4 to a predetermined temperature (around 600° C.) so as to heat the reformers 22. Then, the fuel provided by the first feed member 31 and the air provided by the second feed member 32 are mixed with each other to form the reactant mixture to be fed to the reformers 22. Thereafter, the hydrogen-rich gas is produced in the heated reformers 22 using the partial oxidation (POX) process, and meanwhile, the reformers 22 are detected by the at least one gas detector 52. When production of the hydrogen-rich gas is ascertainably detected by the at least one gas detector 52, the temperature of the reformers 22 is ensured to have reached the required reaction temperature for safe operation. Subsequently, the fuel and water provided by the first feed member 31 and the air provided by the second feed member 32 are mixed in the mixing chamber 33 to form the reactant mixture to be fed to the reformers 22, and then the hydrogen-rich gas is produced from the reactant mixture by the reformers 22 using the autothermal reforming (ATR) process.

By way of the inclusion of a plurality of the reformers 22 in the receiving space 211, total heating surface areas of the reformers 22 are increased and the reformers 22 can be evenly heated by the heater 41. Thus, the heating rate can be increased and the thermal energy generated during the production of the hydrogen-rich gas can be recycled as a thermal energy resource for subsequent operations of producing the hydrogen-rich gas, and thus reducing the demand for the thermal energy generated by the heater 41. In addition, since the air is heated when flowing in the gas pipe 23 that winds around the one of the reformers 22 with the thermal energy generated therefrom during the production of the hydrogen-rich gas, an additional heating member is not required for heating the air. Thus, the thermal control effect of the hydrogen producing apparatus is enhanced. Furthermore, the temperature of the reformers 22 can be measured by the at least one thermometer 51, and thus the thermal stability of the heated reformers 22 can be detected. When the temperature of the heated reformers 22 is lower than the predetermined temperature or higher than the predetermined temperature, the turn-on state or turn-off state of the heater 41 of the heating unit 4 may be correspondingly switched by the control unit 6, and a feeding quantity and a feeding rate of the feed unit 3 may also be controlled by the control unit 6. Therefore, the hydrogen producing apparatus can achieve good reaction efficiency, and prevents carbon deposition caused by an incomplete reaction carried out in the reformers 22 at a temperature lower than the predetermined temperature.

Figure 3:
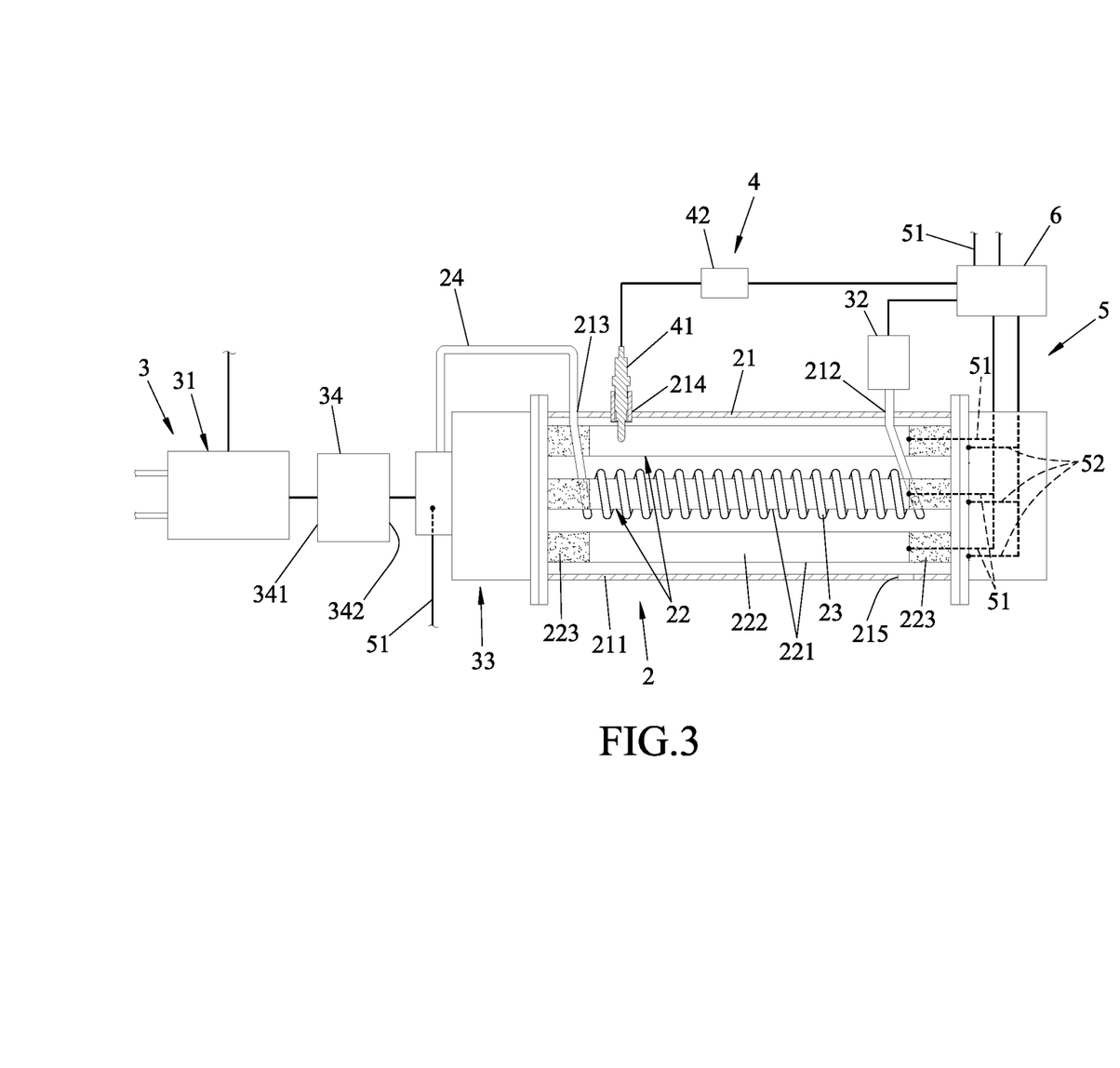
FIG. 3 is a partially cross-sectional view illustrating a second embodiment of a hydrogen producing apparatus according to the disclosure.

FIG. 3 illustrates a second embodiment of the hydrogen producing apparatus according to this disclosure. The feeding unit 3 further includes an emulsifier 34 that is disposed downstream of the first feed member 31 and upstream of the mixing chamber 33, and that is in fluidic communication with the first feed member 31. Thus, the fuel and the water provided from the first feed member 31 are mechanically emulsified in the emulsifier 34 to form an emulsion fuel which is subsequently fed into the mixing chamber 33 for further mixing with the air.

During the mechanical emulsification of the fuel and water, none of additional chemical additives is added to the emulsifier 34.

The emulsifier 34 may have a main body having a variable cross-sectional dimension and is unevenly formed with a plurality of through holes (not shown), so as to control the flow rate of a mixture of the fuel and the water. A great decrease in fluid pressure and a good flow rate difference are formed during the flowing of the mixture through the through holes, and thus an interface between the fuel and the water is destroyed so as to make the emulsion fuel. Since the fuel and water are emulsified before the reactant mixture is formed, the reactant mixture to be fed to the reformers 22 is homogenous. Hence, the reformers 22 are able to operate efficiently, and lower operation efficiency of the reformers 22 resulting from the immiscibility of the fuel and the water can be avoided.

In the embodiment, the emulsifier 34 includes an emulsifier inlet 341 and an emulsifier outlet 342. The emulsifier inlet 341 is configured for introduction of the fuel and the water. The emulsifier outlet 342 is positioned downstream of the emulsifier inlet 341 and is in fluidic communication with the mixing chamber 33. The emulsion fuel and the air are introduced from the emulsifier outlet 342 and the connecting pipe 24, respectively, into the mixing chamber 33 so as to form the reactant mixture. Since the emulsification is affected by the cross-sectional dimensions of the emulsifier inlet 341 and the emulsifier outlet 342, the emulsification effect of the fuel and water is poor when the cross-sectional dimensions of the emulsifier inlet and outlet 341, 342 are improperly large. When the cross-sectional dimensions of the emulsifier inlet and outlet 341, 342 are improperly small, the flow rate of the fuel and the water to be emulsified through the emulsifier inlet and outlet 341, 342 is slow. Thus, a cross-sectional dimension ratio of the emulsifier inlet 341 to the emulsifier outlet 342 is exemplified to range from 4 to 25, and a decrease in fluid pressure between the emulsifier inlet 341 and the emulsifier outlet 342, which is measured when the fuel and the water flow through the emulsifier 34, is exemplified to be no greater than 20 mbar, so as to obtain a relatively good emulsifying effect. The emulsifier 34 has no significant effect on the discharge of the fuel and the water from the feed unit 3, but has a positive effect on the mixing of the fuel and the water in the mixing chamber 33 so as to enhance the hydrogen-production efficiency of the reformers 22.

Figure 4:
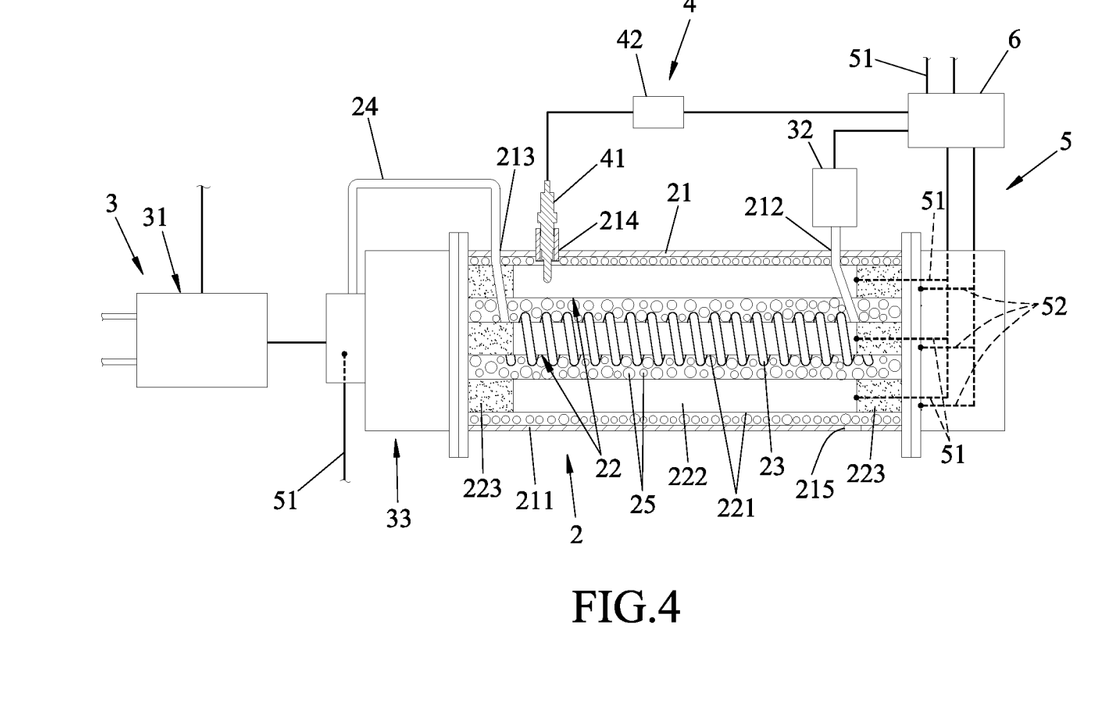
FIG. 4 is a partially cross-sectional view illustrating another configuration of the first embodiment.

FIG. 4 illustrates another configuration of the first embodiment of the hydrogen producing apparatus according to this disclosure. The reforming unit 2 further includes a plurality of ceramic particles 25 received in the receiving space 211 of the casing 21 outside the reformers 22 and the gas pipe 23. With the inclusion of the ceramic particles 25, the thermal energy generated by the heater 41 and by the reformers 22 can be retained in the hydrogen producing apparatus for an extended period. Thus, the temperature of each of the reformers 22 is distributed evenly, and can be maintained at the predetermined temperature, thereby improving the reaction efficiency of the reformers 22 and the thermal management of the hydrogen producing apparatus. In addition, each of the ceramic particles 25 may have a relatively high porosity, and thus the heated air can flow through the pores of the ceramic particles 25 and will not be unduly dragged by the ceramic particles 25. Thus, the flow rate of the air in the receiving space 211 is not reduced.

Figure 5:
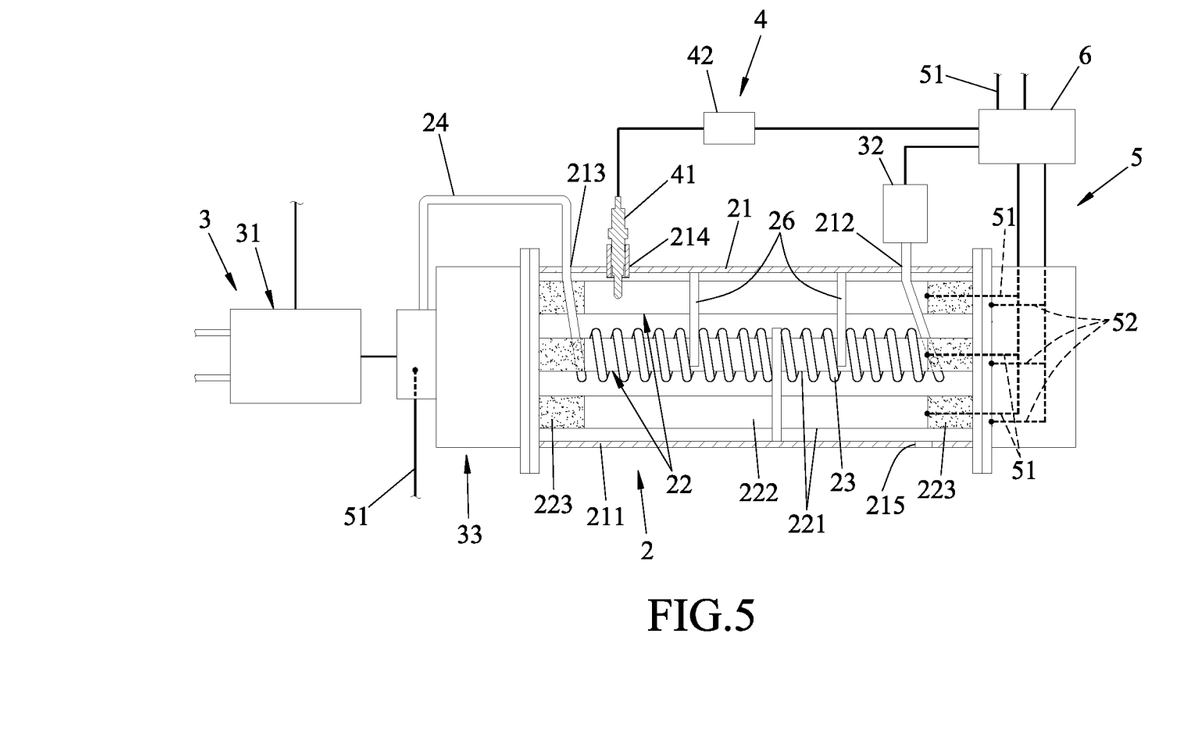
FIG. 5 is a partially cross-sectional view illustrating still another configuration of the first embodiment.

Referring to FIG. 5, in another configuration of the first embodiment, the reforming unit 2 further includes at least one air deflector 26 that is connected to the casing 21 and that is received in the receiving space 211 outside the reformers 22 and the gas pipe 23. By way of the inclusion of the at least one air deflector 26, the convection of heat in the receiving space 211 is enhanced, and the reformers 22 are evenly heated by the hot air distributed in the receiving space 211. The reforming unit 2 may include a plurality of the air deflectors 26 that are spaced apart from each other. The air deflectors 26 are connected to the casing 21 and are received in the receiving space 211 in a staggered manner, thereby achieving a relatively good efficiency of heat transfer. In FIG. 5, a number of the air deflectors 26 are exemplified to be three.

To sum up, by virtue of more than one of the reformers 22 disposed in the receiving space 211, when the receiving space 211 is heated by the heater 41, the reformers 22 can be evenly heated by the heat distributed therearound. In addition, by virtue of filling the ceramic particles 25 and arrangement of the air deflectors 26, heat storage capacity and convection of heat in the receiving space 211 of the hydrogen producing apparatus can be increased, so as to enhance the overall heat recycling and thermal management efficiency of the hydrogen producing apparatus. Moreover, with the inclusion of the emulsifier 34, the fuel and the water used in the ATR process can be emulsified before mixing with the air, and thus avoiding a problem of decreased efficiency of hydrogen production due to immiscibility of the fuel and the water.

In the description above, for the purposes of explanation, numerous specific details have been set forth in order to provide a thorough understanding of the embodiments. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. A hydrogen producing apparatus, comprising:
    a reforming unit including
        a casing that defines a receiving space therein and that has a gas intake port and a gas outlet port spaced apart from said gas intake port, said gas intake and outlet ports being in fluidic communication with said receiving space,
        a plurality of reformers that are separately disposed in said receiving space and that are in non-fluidic communication with said receiving space,
        at least one gas pipe that extends between and through said gas intake and outlet ports of said casing and that winds around one of said reformers, and
        a connecting pipe that has a first end connected to said gas outlet port and is in fluidic communication with said at least one gas pipe, and a second end that is opposite to said first end;
    a feed unit being connected to said casing and being in fluidic communication with said reformers and said second end of said connecting pipe such that air delivered from said gas intake port through said gas pipe and said connecting pipe is mixed with a fuel in said feed unit to form a reactant mixture to be fed to said reformers for hydrogen production, wherein the feed unit includes an emulsifier; and
    a heating unit including a heater that is connected to said casing and that is configured for heating said receiving space.

2. The hydrogen producing apparatus of claim 1, wherein each of said reformers of said reforming unit includes:
    a tubular body that has an inlet end that is connected to and in fluidic communication with said feed unit, an outlet end opposite to said inlet end, and a reaction portion connected between said inlet and outlet ends;
    a catalyst for a hydrocarbon fuel reforming process that is received in said reaction portion; and
    two porous ceramic members that are disposed in said inlet and outlet ends, respectively, and connected to said catalyst.

3. The hydrogen producing apparatus of claim 1, wherein said reforming unit further includes a plurality of ceramic particles received in said receiving space outside said reformers and said gas pipe.

4. The hydrogen producing apparatus of claim 1, wherein said reforming unit further includes at least one air deflector received in said receiving space outside said reformers and said gas pipe.

5. The hydrogen producing apparatus of claim 4, wherein said at least one air deflector includes a plurality of said air deflectors that are spaced apart from each other, said air deflectors being connected to said casing and received in said receiving space in a staggered manner.

6. The hydrogen producing apparatus of claim 1, wherein said feed unit includes
    a first feed member that is configured for providing the fuel,
    a second feed member that is spaced apart from said first feed member and that is configured to be in fluidic communication with said connecting pipe through said gas pipe for providing the air, and
    a mixing chamber that is disposed downstream of and in fluidic communication with said first feed member and said connecting pipe such that the fuel that is provided from said first feed member and the air that is provided from said second feed member through said gas pipe and said connecting pipe are mixed to form the reactant mixture in said mixing chamber.

7. The hydrogen producing apparatus of claim 6, wherein said first feed member of said feed unit is configured for further supplying water, and wherein said emulsifier is disposed downstream of said first feed member and upstream of said mixing chamber and that is in fluidic communication with said first feed member and said mixing chamber such that the fuel and the water provided from said first feed member are mechanically emulsified in said emulsifier.

8. The hydrogen producing apparatus of claim 7, wherein said emulsifier of said feed unit includes an emulsifier inlet for introduction of the fuel and the water and an emulsifier outlet positioned downstream of said emulsifier inlet and being in fluidic communication with said mixing chamber;
    wherein said emulsifier has a cross-sectional dimension ratio of said emulsifier inlet to said emulsifier outlet ranging from 4 to 25; and
    wherein said emulsifier has a decrease in fluid pressure between said emulsifier inlet and said emulsifier outlet, which is measured when the fuel and the water flowing through said emulsifier being no greater than 20 mbar.

9. The hydrogen producing apparatus of claim 1, further comprising a detection unit that includes at least one thermometer configured for measuring a temperature of said mixing chamber and a temperature of said outlet end of said tubular body of each of said reformers, and at least one gas detector configured for detecting gas flowing out of said outlet end of said tubular body of each of said reformers.

10. The hydrogen producing apparatus of claim 9, further comprising a control unit coupled to said detection unit and said feed unit for receiving detection signals transmitted from said at least one thermometer and said at least one gas detector and for transmitting control signals to said feed unit based on the received detection signals.

* * * * *